United States Patent [19]

Seiffert et al.

[11] 4,225,155
[45] Sep. 30, 1980

[54] PASSIVE SAFETY DEVICE FOR SECURING OCCUPANTS OF VEHICLES, IN PARTICULAR MOTOR VEHICLES

[75] Inventors: Ulrich Seiffert, Brunswick; Wilfried Schwanz, Ahnsen, both of Fed. Rep. of Germany

[73] Assignee: Volkswagenwerk Aktiengesellschaft, Wolfsburg, Fed. Rep. of Germany

[21] Appl. No.: 952,978

[22] Filed: Oct. 20, 1978

[30] Foreign Application Priority Data

Nov. 4, 1977 [DE] Fed. Rep. of Germany ....... 2749417

[51] Int. Cl.² ............................................. B60R 21/10
[52] U.S. Cl. .................................. 280/804; 297/469; 307/10 SB
[58] Field of Search ............... 280/802, 803, 804, 808; 180/82 C; 307/10 SB; 297/388, 389, 468, 469

[56] References Cited

U.S. PATENT DOCUMENTS

| | | | |
|---|---|---|---|
| 3,133,277 | 5/1964 | Hood | 280/801 X |
| 3,147,819 | 9/1964 | Keleher | 280/801 X |
| 3,570,621 | 3/1971 | Hampton | 280/801 X |
| 4,061,365 | 12/1977 | Nagano et al. | 280/804 |

FOREIGN PATENT DOCUMENTS

2210078 10/1972 Fed. Rep. of Germany ........... 280/804
2306224 9/1973 Fed. Rep. of Germany ........... 280/804

*Primary Examiner*—John J. Love
*Assistant Examiner*—Michael Mar
*Attorney, Agent, or Firm*—Brumbaugh, Graves, Donohue & Raymond

[57] ABSTRACT

An improved automobile safety device of the type having a shoulder safety belt extending diagonally across the upper body of a passenger and connected to a slide displaceable in a guide attached to the automobile frame. The belt is attached to the slide by a belt lock rigidly fastened to the slide, which assumes a spatially defined position when the slide is in the passenger-restraining position. An electric switch having an actuating element for effecting either a first switching state or a second switching state is attached to the vehicle body and positioned such that the belt lock engages the actuating element only when the slide is in the restraining position. The switch assumes the first switching state when the belt lock and slide are in the restraining position, and assumes the second switching state when the lock and slide are moved away from the restraining position.

3 Claims, 3 Drawing Figures

U.S. Patent  Sep. 30, 1980  4,225,155
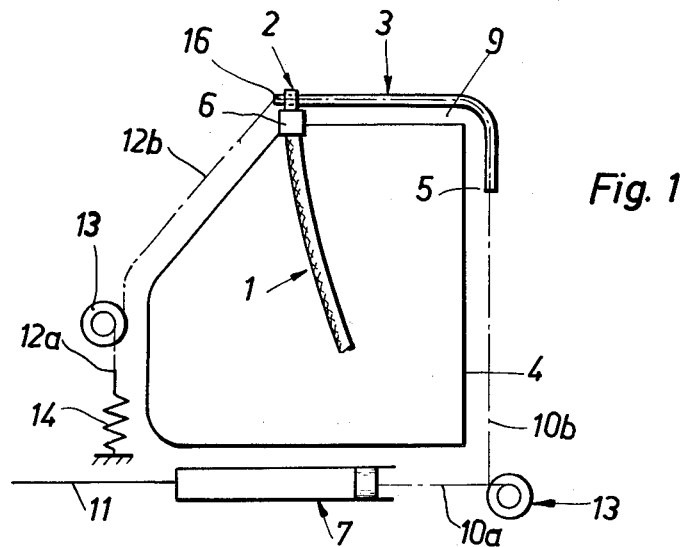
Fig. 1
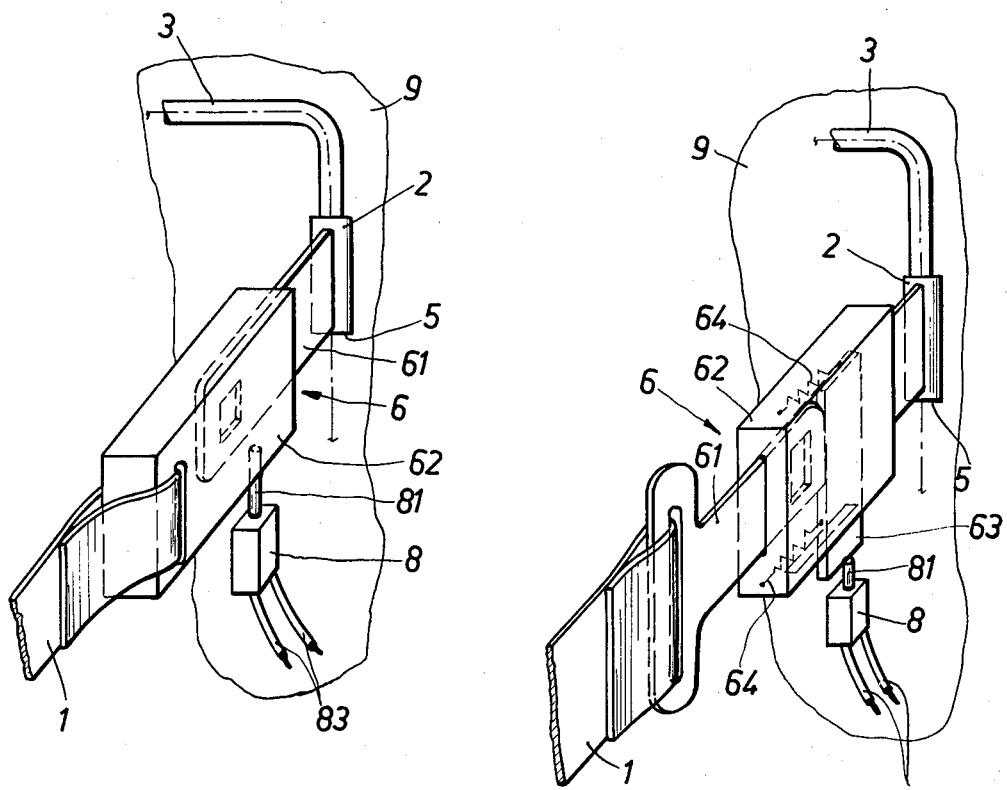
Fig. 2
Fig. 3

PASSIVE SAFETY DEVICE FOR SECURING OCCUPANTS OF VEHICLES, IN PARTICULAR MOTOR VEHICLES

BACKGROUND OF THE INVENTION

This invention is an improved automobile passive safety device of the type having a shoulder safety belt extending diagonally across the upper body of a passenger.

Various safety belt devices are known, which are referred to as passive safety devices. In such devices the passenger need not put on or take off the restraining device since this occurs automatically on closing and opening, respectively, of the vehicle door. Passive safety devices have come into increasing use of late due to the fact that many vehicle occupants, for reasons of convenience or otherwise, do not use the safety belts provided for their own protection.

Several forms for these devices are known. In German OS 22 47 595, a passive device is shown in which a safety belt is fixed on the vehicle door at shoulder level of the vehicle occupant. The belt is displaced from a removed position wherein the belt is lifted away from the automobile passenger to a restraining position wherein the belt extends across the upper body of the passenger automatically upon opening and closing of the vehicle door, respectively. In German OS 22 54 103 and German OS 25 22 415, the door-side end of a diagonally-extending shoulder safety belt is fastened on a slide supported in a guide in the side region on the vehicle body. The slide is displaceable by means of a driving device, for example, a vacuum-actuated piston-cylinder unit or an electric motor, from the removed position to the restraining position. Even though it is a passive restraining device not normally intended to be attached and unhooked by the passenger, the door-side end of the belt may be attached to the slide by an emergency opening lock which will normally be engaged (see for example German OS 22 47 595 and German OS 25 05 971). This will facilitate the removal of the safety belt in an emergency situation, for example, after a vehicle accident, should the restraining device become permanently locked in place either at the door-side or at the other end of the belt, where there is generally a belt take up and winding mechanism.

In passive safety devices of this type, it is also common to use an electric switch arranged in the belt lock which, when the belt is not connected, either prevents the starting of the motor (an interlock system), or which sets off a signal to the driver indicating that the safety belt or belts have not been attached. See for example, U.S. Pat. No. 3,133,277; U.S. Pat. No. 3,147,819; U.S. Pat. No. 3,570,621; or German OS 20 06 029.

An interlock system or a warning system which operates with such an electric switch can be difficult to incorporate into a passive safety device in which one end of the safety belt is fastened to a belt lock in a displaceable slide. If the switch is built into the belt lock, not only the switch but also the electric wires leading to the switch must be moved back and forth when the slide moves. Also, the other end of the safety belt is generally contained in a winding mechanism arranged between the vehicle seats, and the electric lead-ins and lead-outs can be run to the belt lock only with considerable difficulty.

SUMMARY OF THE INVENTION

This invention is an improved automobile passive safety device of the type having a shoulder safety belt extending diagonally across the upper body of a passenger, one end of which is attached to a slide displaceable in a guide attached to the automobile frame above one of the automobile doors, and a driving mechanism for displacing the slide from a removed position wherein the belt is lifted away from the automobile passenger to a restraining position wherein the belt extends across the upper body of the passenger. This safety device can be taken off or released without difficulty in emergencies, and provides an unmistakable electrical signal for use in either an interlock or a seat belt indicating device, and which overcomes the difficulties described above.

More particularly, one end of the belt is attached to the slide by a belt lock rigidly fastened to the slide. The belt lock assumes a spatially defined position when the slide is in the restraining position. An electric switch having an actuating element for effecting either a first switching state or a second switching state of the switch is attached to the vehicle body and positioned such that the belt lock engages the actuating element only when the slide is in the restraining position. The switch assumes the first switching state when the lock and slide are in the restraining position, and assumes the second switching state when the lock and slide are moved away from the restraining position.

In one form of the device, the belt lock includes a locking tongue attached to the slide and a lock housing connected to the belt, the housing including means for receiving the tongue in locking engagement. The switch is positioned such that the actuating element is engaged by the lock housing only when the belt lock and slide are in the restraining position and the housing is attached to the tongue.

In another form of the device, the belt lock includes a lock housing attached to the slide and a locking tongue connected to the safety belt. The housing receives the tongue in locking engagement, and also includes a sliding tappet arranged soas to be engaged by the tongue when the tongue is inserted in the housing to project outwardly from the housing at a defined position relative to the housing. The switch is positioned such that the actuating element is engaged by the tappet only when the slide is in the restraining position and the tappet is in its defined position, that is, the locking tongue has been inserted into the housing.

Thus, in accordance with the invention, the belt lock attaches the safety belt to the slide such that it may be removed rapidly in cases of emergency, and assumes a spatially defined position at all times to control the electric switch fixed on the vehicle body. Due to the spatially fixed arrangement of the electrical switch, the routing of the necessary electric wires is simplified and the danger of damage to the wires is reduced.

BRIEF DESCRIPTION OF THE DRAWINGS

For a better understanding of the invention, reference is made to the drawings illustrating two preferred embodiments of the invention, and the accompanying Detailed Description, in which:

FIG. 1 is a schematic diagram of a passive safety device according to the present invention, showing the device in its removed position;

FIG. 2 illustrates one form of belt lock and switch for use with the passive safety device of FIG. 1, wherein the device is in its restraining position; and FIG. 3 shows another form of belt lock and switch for use in the passive safety device of FIG. 1, the device also shown in its restraining position.

DETAILED DESCRIPTION OF THE PREFERRED EMBODIMENTS

Referring to FIG. 1, an automobile passive safety device is shown having a shoulder safety belt 1 which is intended to extend diagonally across the upper body of a passenger. The safety belt 1 is attached to a slide 2 displaceable in a guide 3 attached to the automobile frame 9 above one of the automobile doors, the door opening 4 being illustrated. The other end of the diagonal shoulder safety belt is wound-up in a winding mechanism, not shown, of a known type which may be fixed, for example, to the floor of the automobile between the seats, or to the side of the frame of a vehicle seat facing the center of the vehicle. The guide 3 is positioned above the door opening 4 next to the vehicle seat. In the position of the slide 2 shown in FIG. 1, the safety belt 1 is in its removed position 16 in which it is lifted off the body of the passenger. The other end of the guide 3 defines the restraining position 5 of the slide in which the safety belt 1 extends across the upper body of the passenger. The arrangement of the guide 3 will depend upon the particular structure of the vehicle. Thus, rather than bending downward as in FIG. 1, the guide may continue horizontally backward.

The slide 2 is displaced from its removed position 16 to its restraining position 5, and vice-versa, by a piston-cylinder unit 7. A pressure line 11 with a vacuum tapping point, not shown, on the suction line of the vehicle engine is attached to the piston-cylinder unit 7 for the purposes of actuation. Connection and disconnection to and from the vacuum tapping point may be controlled by electro-magnetically actuatable control valves, not shown. In place of the vacuum-actuated piston-cylinder unit 7, any other suitable driving unit, for example, an electric motor, may be used. The actuating piston of the piston-cylinder unit 7 is connected to a cable line 10a, a transmission guide pulley 13, and a second cable line 10b, connected in turn to the slide 2. The transmission guide pulley 13 acts to step up the slide displacement relative to the displacement of the piston. The slide 2 is also connected to a cable line 12b, a transmission guide pulley 13, a second cable line 12a, and a return spring 14, which together act in opposition to the force of the piston-cylinder unit 7. Thus, the spring 14 acts to keep all of the cable lines 10a, 10b, 12a and 12b under constant tension.

From the removed position 16 of the safety belt device shown in FIG. 1, displacement of the slide 2 along the guide 3, which may be a split tube, is obtained when the piston-cylinder unit 7, through actuation of the control valve, not shown, is connected with the vacuum tapping point on the engine suction line. Due to the vacuum produced thereby in the cylinder, the piston is moved from the righthand starting position in FIG. 1 towards the left. The slide 2 is displaced toward the right until it reaches the restraining position 5. Simultaneously, the return spring 14 is tensioned so that it returns the slide to its removed position 16 when the force exerted by the piston-cylinder unit 7 is removed by suitable control measures. The design and control of such driving devices to move the slide 2 to a stationary restraining position 5 are well known.

Referring to FIG. 2, the door-side end of the diagonal shoulder safety belt 1 is attached to a belt lock 6 which is rigidly fastened to the slide 2 so as to assume a spatially-defined position when the slide 2 is in the restraining position 5. The belt lock 6 includes a locking tongue 61 which is rigidly fixed on the slide 2, and a lock housing 62 which is connected to the one end of the belt 1. The lock housing 62 receives the locking tongue 61 in locking engagement, and may include any standard disengagement mechanism for an emergency use, not shown.

An electric switch 8 which forms part of an interlock or indicating system is attached to the vehicle body 9 in the area of the fixed restraining position of the slide 2. The switch 8 includes an actuating element 81, and the switch 8 is positioned such that the lock housing 62 engages the actuating element 81 only when the belt lock 6 and slide 2 are in the restraining position 5 and the lock housing 62 is attached to the tongue 61. The actuating element 81 of the switch 8, depending upon its position, effects either a first switching state or a second switching state of the switch 8 as a signal to the seal belt warning or interlock system. The electric switch 8 assumes the first switching state when the belt lock 6 is in the restraining position 5 and the actuating element 81 is engaged, and a second switching state when the belt lock 6 is removed from the restraining position 5, or if the housing 62 is disconnected from tongue 61.

Thus, unmistakable electric signals are delivered to a signal system or an interlock system indicating whether or not the safety belt 1 is attached and in its restraining position. More particularly, in this device, in order for a signal to be delivered indicating that the device is attached, it is necessary both that the slide is in its fixed restraining position 5 and that the belt 6 is connected. If the belt lock housing 62 is unlatched, that is, the lock housing 62 is not attached to the locking tongue 61, the actuating element 81 of the electric switch will not be actuated because the locking tongue 61, by itself, is too far removed from the operating element 81.

Referring to FIG. 3, an alternate form of the belt lock 6 is shown. In this embodiment, the lock housing 62 of the belt lock 6 is rigidly fixed on the slide 2. A locking tongue 61, which may be inserted into the lock housing 62, is connected with the door-side end of the safety belt 1. As in the case of the embodiment shown in FIG. 2, the belt lock 6 assumes a spatially defined position when the slide 2 is in its restraining position 5. An electric switch 8 is attached to the vehicle body 9 in the area of the restraining position 5 of the belt lock 6. Unlike the embodiment shown in FIG. 2, the actuating element 81 of the switch 8 is not directly actuated by the lock housing 62 when the slide 2 is in its restraining position 5. The housing 62 is provided with a tappet 63 or the like, arranged soas to be engaged by the locking tongue 61 when the tongue 61 is inserted in the housing 62. When the tongue 61 is inserted, the tappet 63 projects outwardly from the housing 62 at a defined position relative to the housing 62. The switch 8, in turn, is positioned such that its actuating element 81 is engaged by the tappet 63 only when the slide 2 is in its restraining position 5, and the tappet is in that defined position, that is, when the tongue 61 is inserted in the housing 62. In the example shown in FIG. 3, a sliding tappet 63 is arranged in the lock housing 62. A spring device 64 connected between the housing 62 and the tappet 63 acts on the tappet 63 urging it back into the lock housing 62 when the locking tongue 61 is not inserted into the lock housing 62. When the tongue 61 is inserted, the tappet 63 projects from the lock housing 62 sufficiently to operate the actuating element 81 of the electric switch 8. Thus, it is assured that the switching state of the electric switch is changed only if both the slide 2 is in its retracting position 5 and the locking tongue 61 is inserted in the lock housing 62 in locking engagement.

In the examples of the embodiment shown in FIGS. 2 and 3, the electric switch is arranged below the belt lock and its actuating element is aligned perpendicularly. Evidently, other arrangements are possible, for example, to the side of the belt lock. Since the electric switch 8 is attached to the vehicle body, the arrangement of the electric lines 83 leading from the switch 8 is greatly simplified, and the danger of damage or wear to the wires during normal use of the safety belt is greatly reduced.

While the invention has been described with reference to two preferred embodiments thereof, it will be understood that it may take other forms while retaining the inventive principles disclosed herein. Thus, the invention may be utilized in a restraining system which combines a diagonal shoulder safety belt with a deformation element arranged in the knee region of the passenger. If adjusted properly, it may also be employed in passive restraining systems with three-point safety belts wherein two of the belt articulations are designed displaceably. All such modifications and variations are intended to be within the scope of the invention, as defined in the following claims.

We claim:

1. In an automobile passive safety device of the type having a shoulder safety belt extending diagonally across the upper body of a passenger, a slide displaceable in a guide attached to the automobile frame above one of the automobile doors, belt lock means for detachably coupling one end of the belt to said slide, and a driving means for displacing said slide from a removed position wherein said belt is lifted away from the automobile passenger to a restraining position wherein said belt extends across the upper body of said passenger, the improvement wherein said belt lock means comprises a first belt lock member rigidly fastened to said slide and a second belt lock member connected to said one end, wherein the second member may be rigidly coupled to said first member to assume a spatially-defined position when said slide is in said restraining position, an electric switch means, and means for actuating said switch means for effecting either a first switching state or a second switching state of said switch means, the actuating means including an actuating element supported by said switch means, wherein said switch means is attached to said vehicle body and positioned such that said second member engages said actuating means to actuate said switch and effect said first switching state only when said slide is in said restraining position and said second member is coupled to said first member, and wherein said switch means assumes said second switching state when said belt lock means and slide are moved away from said restraining position or said second member is uncoupled from said first member.

2. A device according to claim 1, wherein said first belt lock member comprises a locking tongue attached to said slide, and said second belt lock member comprises a lock housing connected to said one end of said belt, said housing including means for receiving said tongue in locking engagement, wherein said switch means is positioned such that said actuating element is engaged by said lock housing only when said lock means and slide are in said restraining position and said lock housing is attached to said tongue.

3. A device according to claim 1, wherein said first belt lock member comprises a lock housing attached to said slide, and said second belt lock member comprises a locking tongue connected to said one end of said belt, wherein said housing includes means for receiving said tongue in locking engagement, and wherein said actuating means comprises a tappet means in said first member, said tappet means arranged so as to be engaged by said tongue when said tongue is inserted in said housing to project outwardly from said housing at a defined position relative to said housing, and wherein said switch means is positioned such that said actuating element is engaged by said tappet means only when said slide is in said restraining position and said tappet means is in said defined position.

* * * * *